(12) United States Patent
Xie (10) Patent No.: US 7,565,445 B2
(45) Date of Patent: Jul. 21, 2009

(54) SYSTEMS AND METHODS FOR CATEGORIZING NETWORK TRAFFIC CONTENT

(75) Inventor: Michael Xie, Palo Alto, CA (US)

(73) Assignee: Fortinet, Inc., Sunnyvale, CA (US)

(*) Notice: Subject to any disclaimer, the term of this patent is extended or adjusted under 35 U.S.C. 154(b) by 630 days.

(21) Appl. No.: 10/993,629

(22) Filed: Nov. 19, 2004

(65) Prior Publication Data

US 2006/0036728 A1 Feb. 16, 2006

Related U.S. Application Data

(60) Provisional application No. 60/580,841, filed on Jun. 18, 2004.

(51) Int. Cl.
*G06F 15/173* (2006.01)

(52) U.S. Cl. ............... 709/238; 709/224; 709/227; 709/232

(58) Field of Classification Search ............ 709/224, 709/227, 232, 238
See application file for complete search history.

(56) References Cited

U.S. PATENT DOCUMENTS

| | | | |
|---|---|---|---|
| 6,161,130 A * | 12/2000 | Horvitz et al. | 709/206 |
| 6,460,036 B1 * | 10/2002 | Herz | 707/10 |
| 6,981,040 B1 * | 12/2005 | Konig et al. | 709/224 |
| 7,246,150 B1 * | 7/2007 | Donoho et al. | 709/204 |
| 2002/0032772 A1 * | 3/2002 | Olstad et al. | 709/224 |
| 2003/0172163 A1 * | 9/2003 | Fujita et al. | 709/226 |
| 2005/0071741 A1 * | 3/2005 | Acharya et al. | 715/500 |
| 2005/0091321 A1 * | 4/2005 | Daniell et al. | 709/206 |
| 2006/0168006 A1 * | 7/2006 | Shannon et al. | 709/206 |

* cited by examiner

*Primary Examiner*—Phuoc Nguyen
(74) *Attorney, Agent, or Firm*—Schwegman, Lundberg & Woessner, P.A.

(57) ABSTRACT

A method for categorizing network traffic content includes determining a first characterization of the network traffic content determining a first probability of accuracy associated with the first characterization, and categorizing the network traffic content based at least in part on the first characterization and the first probability of accuracy. A method for use in a process to categorize network traffic content includes obtaining a plurality of data, each of the plurality of data representing a probability of accuracy of a characterization of network traffic content, and associating each of the plurality of data with a technique for characterizing network traffic content. A method for categorizing network traffic content includes determining a characterization of the network traffic content, determining a weight value associated with the characterization, and categorizing network traffic content based at least in part on the characterization of the network traffic content and the weight value.

50 Claims, 5 Drawing Sheets

| Tests | Accuracy | Content Characterization |
|-------|----------|--------------------------|
| ILA | 10% | Porno |
| ELA | 20% | Educational |
| MTA | 40% | Porno |
| TKA | 30% | News |

SYSTEMS AND METHODS FOR CATEGORIZING NETWORK TRAFFIC CONTENT

RELATED APPLICATION DATA

This application claims priority to U.S. Provisional Application No. 60/580,841, filed Jun. 18, 2004, entitled, "RFRE—Realtime Fortinet Rating Engine," the disclosure of which is expressly incorporated by reference herein.

BACKGROUND

The field of the invention relates to computer systems and computer networks, and more particularly, to systems and methods for categorizing content of computer and network traffic.

Many organizations face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, a common solution for blocking unwanted Web activity is to block access to a list of banned or blacklisted web sites and pages based on their URLs. However, such approach may be unnecessarily restrictive, preventing access to valid content in web sites that may contain only a limited amount of undesirable material. Also, the list of blocked URLs requires constant updating.

Many email spam elimination systems also use blacklists to eliminate unwanted email messages. These systems match incoming email messages against a list of mail servers that have been pre-identified to be spam hosts, and prevent user access of messages from these servers. However, spammers often launch email spam from different hosts every time, making it difficult to maintain a list of spam servers.

It would be desirable to categorize network traffic content, and prevent undesirable network traffic content (e.g., content that belongs to an undesirable category) to be passed to users. Currently, many content detecting systems use human based categorization to categorize network content. In such systems, an operator manually analyzes network content, then uses the results of the analysis to categorize the network content. Although such techniques may produce reliable results, they are labor intensive and time consuming.

In another technique, HTML links are analyzed to determine a characteristic of network content. However, such technique may erroneously mischaracterize network content. Companies have also used other techniques for characterizing network content, but each of these techniques may not produce reliable result.

Accordingly, new systems and methods for categorizing content of computer and network traffic would be useful.

SUMMARY

In accordance with some embodiments, a method for categorizing network traffic content includes determining a first characterization of the network traffic content, determining a first probability of accuracy associated with the first characterization, and categorizing the network traffic content based at least in part on the first characterization and the first probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, and categorizing the network traffic content based at least in part on the first characterization and the first probability of accuracy.

In accordance with other embodiments, a device for categorizing network traffic content includes means for determining a first characterization of the network traffic content, means for determining a first probability of accuracy associated with the first characterization, and means for categorizing the network traffic content based at least in part on the first characterization and the first probability of accuracy.

In accordance with other embodiments, a method for use in a process to categorize network traffic content includes obtaining a plurality of data, each of the plurality of data representing a probability of accuracy of a characterization of network traffic content, and associating each of the plurality of data with a technique for characterizing network traffic content.

In accordance with other embodiments, a computer product includes a computer-readable medium, the computer-readable medium having a set of stored instructions, an execution of which causes a process to be performed, the process comprising obtaining a plurality of data, each of the plurality of data representing a probability of accuracy of a characterization of network traffic content, and associating each of the plurality of data with a technique for characterizing network traffic content.

In accordance with other embodiments, a device for categorizing network traffic content includes means for obtaining a plurality of data, each of the plurality of data representing a probability of accuracy of a characterization of network traffic content, and means for associating each of the plurality of data with a technique for characterizing network traffic content.

In accordance with other embodiments, a method for categorizing network traffic content includes determining a characterization of the network traffic content, determining a weight value associated with the characterization, and categorizing network traffic content based at least in part on the characterization of the network traffic content and the weight value;

In accordance with other embodiments, a computer product includes a computer-readable medium, the computer-readable medium having a set of stored instructions, an execution of which causes a process to be performed, the process comprising determining a characterization of the network traffic content, determining a weight value associated with the characterization, and categorizing network traffic content based at least in part on the characterization of the network traffic content and the weight value.

In accordance with other embodiments, a device for categorizing network traffic content includes means for determining a characterization of the network traffic content, means for determining a weight value associated with the characterization, and means for categorizing network traffic content based at least in part on the characterization of the network traffic content and the weight value.

In accordance with other embodiments, a method for categorizing network traffic content includes determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

In accordance with other embodiments, a system for categorizing network traffic content includes means for determining a first characterization of the network traffic content, means for determining a first probability of accuracy associated with the first characterization, means for determining a second characterization of the network traffic content using a second technique, wherein the second technique is different from the first technique, means for determining a second probability of accuracy associated with the second characterization, and means for categorizing the network traffic content based at least in part on the first characterization, the second characterization, the first probability of accuracy, and the second probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of various embodiments, in which similar elements are referred to by common reference numerals. More particular descriptions will be rendered by reference to specific embodiments, which are illustrated in the accompanying drawings. Understanding that these drawings are not to be considered limiting in scope, the embodiments will be described and explained with additional specificity and detail through the use of the accompanying figures.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments, and are not intended as an exhaustive description of the invention, or as a limitation on the scope of the invention. In addition, an illustrated embodiment need not have all the aspects or advantages of the invention shown. An aspect or an advantage described in conjunction with a particular embodiment is not necessarily limited to that embodiment and can be practiced in any other embodiments even if not so illustrated.

Figure 1:
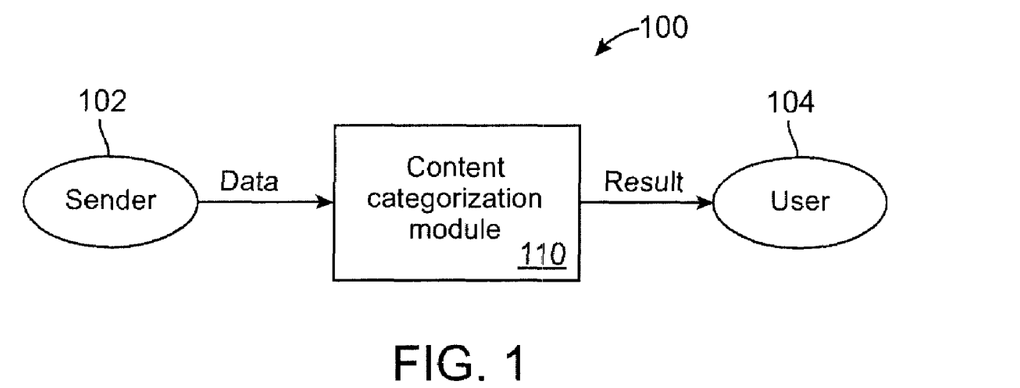
FIG. 1 illustrates a block diagram representing a system that includes a module for categorizing network traffic content in accordance with some embodiments.

FIG. 1 illustrates a block diagram of a system 100, which includes a content categorization module 110 for categorizing network traffic content in accordance with some embodiments. Sender 102 transmits data associated with network traffic content, such as email content or Web content, to module 110. Module 110 receives the transmitted data, determines a category to which the network traffic content belongs (e.g., categorize the network traffic content), and causes a result, such as a message, to be sent to a user 104. The message sent to user 104 notifies the user 104 that a content belonging to a category has been detected. As used in this specification, the term "user" should not be limited to a human user, and can include a server or other types of devices that can receive information. Also, as used in this specification, the term "sender" should not be limited to a human sender, and can include a server or other types of devices that can transmit information.

In some embodiments, module 110 can be implemented using software. For example, module 110 can be implemented using software that is loaded onto a user's computer, a server, or other types of memory, such as a disk or a CD-ROM. In some cases, module 110 can be implemented as Web applications. In alternative embodiments, module 110 can be implemented using hardware. For example, in some embodiments, module 110 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (I st Edition, June 1997), are well known in the art of circuit design, and therefore will not be described in further detail herein. In other embodiments, module 110 can also be any of a variety of circuits or devices that are capable of performing the functions described herein. For example, in alternative embodiments, module 110 can include a general purpose processor, such as a Pentium processor. In other embodiments, module 110 can be implemented using a combination of software and hardware. In some embodiments, module 110 may be implemented as a firewall, a component of a firewall, or a component that is configured to be coupled to a firewall.

Figure 2:
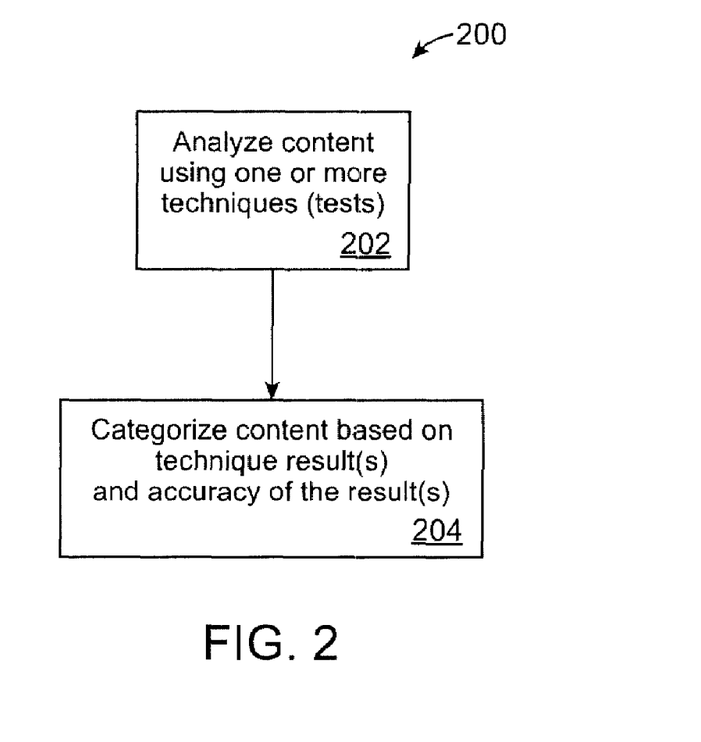
FIG. 2 illustrates a method for categorizing network traffic content in accordance with some embodiments.

FIG. 2 illustrates a method 200 for categorizing network traffic content in accordance with some embodiments. First, module 110 receives data associated with network traffic content and analyzes the content using one or more techniques (Step 202). The techniques used will depend on the type of content being analyzed. For the purpose of the following discussion, it is assumed that the content being analyzed is Web-related content. However, it should be understood by those skilled in the art that the process 200 of FIG. 2 can be used to categorize other types of content.

The illustrated embodiments use four representative techniques (which may be tests) to independently analyze and characterize the Web-related content. The first representative technique involves performing an Internal Link Analysis (ILA). ILA is based on the theory that a website may have HTML links 10 to other sites with similar characteristics. In such cases, module 110 includes an ILA engine for analyzing HTML links within an URL (with predefined depth—number of layers of sub-page). Using such technique, if the majority of links associated with the Web content points to a URL associated with a certain characterization (e.g., educational, advertising, etc.), the Web content is determined (characterized) as having such characterization. The number of available characterizations associated with the ILA technique can vary. For example, in some embodiments, four possible characterizations (reference characterizations) can be made available: educational, advertising, porno, and news.

The second representative technique involves performing an External Link Analysis (ELA). ELA is based on the theory that if most people consider a website as having a certain characterization (e.g., educational, advertising, etc.), the website is then determined to have such characterization. In such cases, a database is maintained (e.g., within module 10 or in a separate memory) that points to a number of prescribed external portal sites that have some categorization of URLs. The portal list is constantly updated and maintained. The portal list can be stored in module 10 or in a separate memory that is coupled to module 10.

The third representative technique involves performing a Meta-Tag Analysis (MTA). MTA is based on the theory that if a majority or a substantial number of meta-tags are associated with a certain characterization (e.g., educational, advertising, etc.), the website is determined as having such characterization. In such cases, module 110 analyzes HTML content and determines if it contains any meta-tags indicating which characterization the content belongs to. For example, if a majority or a substantial number of meta-tags are associated with a certain characterization, module 110 then determines the content as having such characterization.

The fourth representative technique involves performing a Token Analysis (TKA). TKA is based on the theory that if content contains a large number of words having the same attribute, then the content is characterized as having the attribute. In such cases, a database of words and phrases is maintained (e.g., in module 110 or in a separate memory). The words and phrases are abstracted to tokens, which can be used by module 110 to analyze a HTML file's content and determine a characterization for the content. For example, if the content being analyzed contains a plurality of texts, the content can first be normalized to make it more "standard" for processing. Normalization of content, can be performed by, for example, converting all letters to upper case, and replacement of all white space characters and punctuation marks with one character (such as a single white space). Next, the database of words may be accessed. In such a database, words are represented by numbers, and each number is associated with one or more attribute. Since every word is represented by a number, module 110 can perform counting, and determines the frequency that these words appear in the content. If the content contains a large number of words having the same attribute (e.g., educational, pornographic, etc.), then the content is determined as having the attribute (characterization). It should be noted that instead of using TKA to analyze text, in other embodiments, TKA can be implemented to analyze graphic(s), or combination of text and graphic(s).

Although four representative techniques for characterizing network traffic content have been described, the scope of the invention should not be so limited. In other embodiments, instead of using four techniques, module 110 can use a different number of techniques to analyze network traffic content. Also, in other embodiments, instead of the four techniques described previously, module 110 can employ different techniques (e.g., variations of the previously described techniques) or different combination of techniques to analyze network traffic content of various types.

After network traffic content has been analyzed and characterized, module 110 determines a category to which the content belongs (i.e., categorizes the content) based on the characterization by the four representative techniques (Step 204). In the illustrated embodiments, the category is determined by associating each technique with an accuracy. The accuracy associated with each technique represents the accuracy of the characterization determined by the technique.

Figure 3:
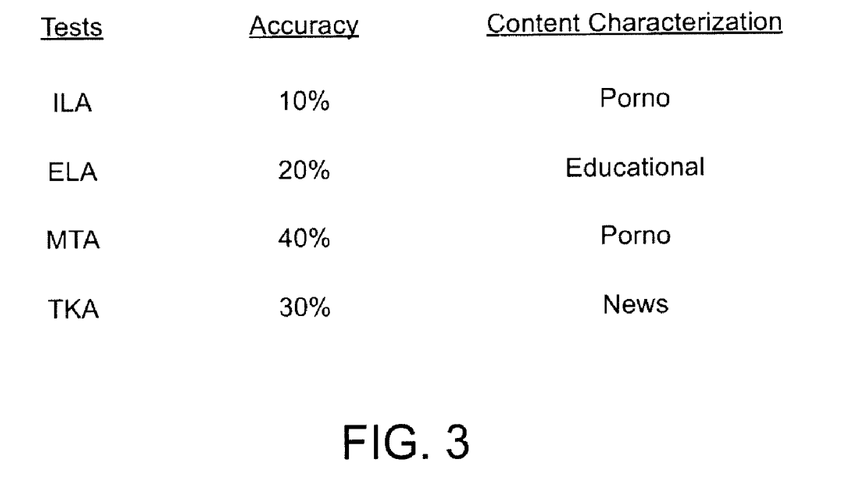
FIG. 3 illustrates an example of results obtained using different techniques for characterizing network traffic content in accordance with some embodiments.

FIG. 3 illustrates an example of results provided by the four representative techniques to characterize a website content. In the example, ILA characterizes the website content as "Porno," ELA characterizes the website content as "Educational," MTA characterizes the website content as "Porno," and TKA characterizes the website content as "News." These characterizations are merely illustrative and could be any of a number of other characterizations. Accuracies of the technique results for the respective four representative techniques are also provided. In the illustrated example, the results provided by the ILA, ELA, MTA, and TKA have a 10% accuracy (i.e., a 10% probability that the result is accurate), a 20% accuracy, a 40% accuracy, and a 30% accuracy, respectively.

In some embodiments, module 110 is configured to determine the accuracies associated with different techniques by receiving the accuracies as inputs. For examples, a user can manually input the accuracies into the module 110, or alternatively, the accuracies can be transmitted to the module 110 via a communication link. Alternatively, module 110 can be configured to calculate the accuracies.

Various methods can be employed to determine the accuracy (or probability of accuracy). In the illustrated embodiments, the accuracy can be determined by performing statistical analysis for each of the four techniques. For example, results provided by ILA can be compared with results provided by human categorization (i.e., categorization performed manually), and be analyzed to determine how accurate they are. Such analysis can be carried out for each of the available reference characterizations for each technique. For example, if ILA includes four possible reference characterizations (e.g., Porno, Educational, News, and Advertisement), then statistical analysis can be performed for each of the four reference characterizations to determine how accurate of a result the ILA can provide with respect to each reference characterization. If it is determined from the statistical analysis that ILA provides "Porno" characterization with 10% accuracy, "Educational" characterization with 30% accuracy, "News" characterization with 20% accuracy, and "Advertisement" characterization with 40% accuracy, then every time ILA characterizes network traffic content as "Porno," "Educational," "New," or "Advertisement," a 10%, 30%, 20%, or 40% will be assigned to the result of characterization, respectively. As such, the accuracy (as expressed in probability value) can be characterization-specific for each of the techniques used.

In other embodiments, accuracies for the categories associated with one technique (e.g., ILA) can be processed to determine an average accuracy for the technique. In such cases, the same average accuracy associated with a technique is used for all possible characterizations for the technique. Using this technique for the above example, a 25% (=(10%+

30%+20%+40%)/4) accuracy will be associated with results provided by the ILA, regardless of the characterization determined by the ILA.

Although accuracy of a technique has been described as a percentage of probability, in other embodiments, accuracy of a technique can be represented by other variables. For example, in alternative embodiments, a weight value representing an accuracy of a result can be associated with each of the techniques used to analyze network traffic content. In such cases, the weight value can be determined based on probability studies of results of the techniques, as similarly discussed previously. In some embodiments, a weight of 0 value can be used to associate results of a technique when a probability study indicates that such technique has an accuracy below a prescribed threshold (e.g., 10%), and a weight having a value of 2 can be used to associate result of a technique when a probability study indicates that such technique has an accuracy above a prescribed threshold (e.g., 50%).

Various techniques can be used to categorize network traffic content based on accuracies of the results provided.

Figure 4:
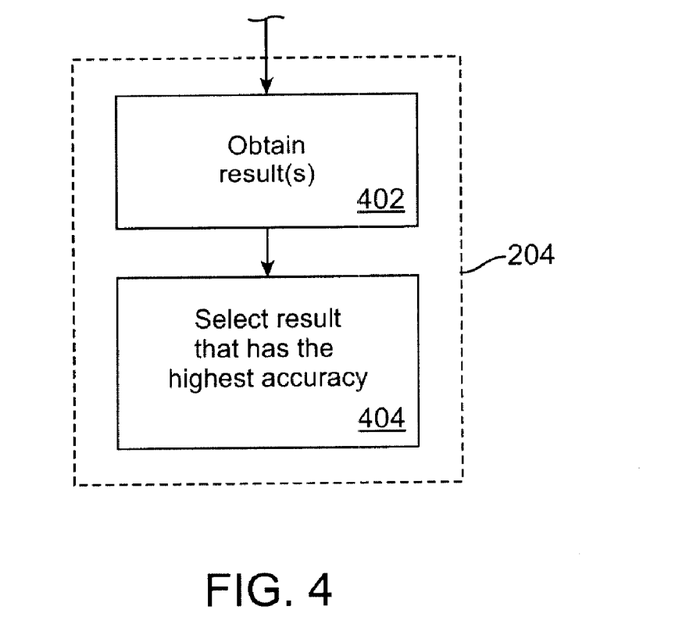
FIG. 4 illustrates a method for categorizing network traffic content using an accuracy of a technique result in accordance with some embodiments.

FIG. 4 illustrates a technique for categorizing network traffic content in accordance with some embodiments. As shown in FIG. 4, the step 204 of categorizing content includes obtaining technique result(s) from step 202 (Step 402), and selecting the result that has the highest accuracy (Step 404). For example, module 110 can be configured or programmed to search for an accuracy that has the highest value, and select the result associated with the highest accuracy for categorizing network traffic content. Using such technique for the above example, module 110 will categorize the content as "Porno" based on the result of the MTA because the MTA characterizes the content as "Porno" and has the highest degree of accuracy (i.e., 40%).

Figure 5:
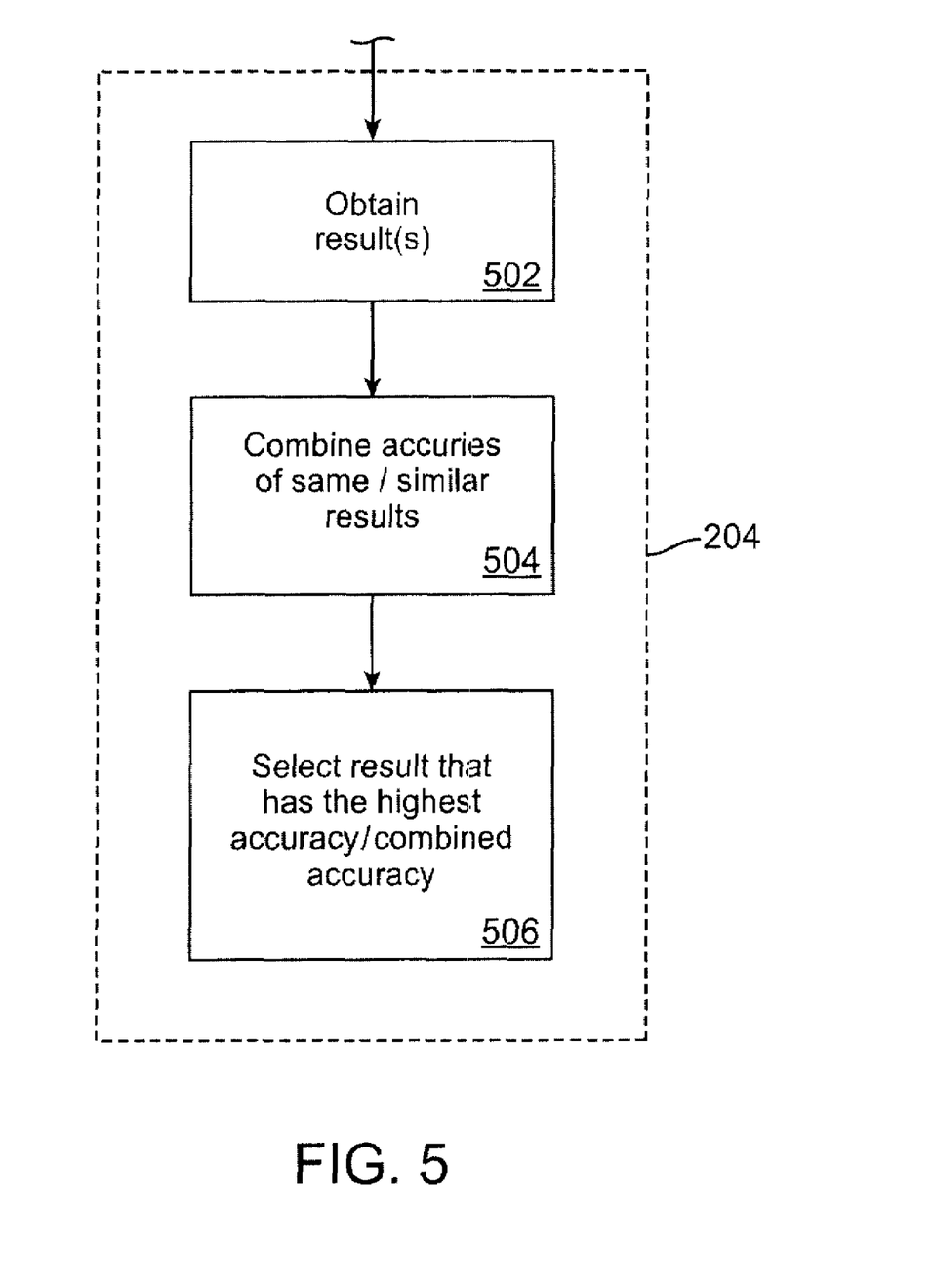
FIG. 5 illustrates a method for categorizing network traffic content using an accuracy of a technique result in accordance with other embodiments.

FIG. 5 illustrates another technique for categorizing network traffic content in accordance with other embodiments. As shown in FIG. 5, the step 204 of categorizing content includes obtaining technique result(s) from step 202 (Step 502), and combining accuracies of two or more characterizations if the characterizations yield the same (or similar) result (Step 504). Using such technique for the above example, module 110 adds the probabilities of accuracy for the ILA and MTA (because these two analysis characterize the network traffic content as "Porno"), thereby producing a combined accuracy of 50% (=10%+40%). The combined accuracy for the characterization is then compared with other accuracies or other combined accuracies for other characterizations, and the characterization associated with the maximum accuracy (or combined accuracy) is then selected to categorize the content (Step 506). Following the above example, the combined accuracy=50% for the "Porno" characterization is compared with the accuracies for the "News" characterization (=30%) and the "Educational" characterization (=10%). Because the "Porno" characterization has the maximum accuracy (=50%), module 110 categorizes the network traffic content as "Porno" based on the combined results provided by the ILA and MTA.

In other embodiments, the module 110 is configured to determine whether an accuracy associated with a result is below or above a prescribed threshold (e.g., by performing a comparison between the accuracy and the prescribed threshold). In such cases, if the accuracy for a technique (e.g., ILA) is below the prescribed threshold, the module 110 then disregards the result provided by the technique. On the other hand, if the accuracy for a technique is above the prescribed threshold, the module 110 then accounts for the result provided by the technique in the content categorization process.

Other algorithms for categorizing network traffic content based on accuracy of technique used can also be employed in other embodiments. For example, in alternative embodiments, the accuracy values can be further processed (e.g., multiplied by one or more weight values), and the processed values are then used to categorize network traffic content.

Figure 6:
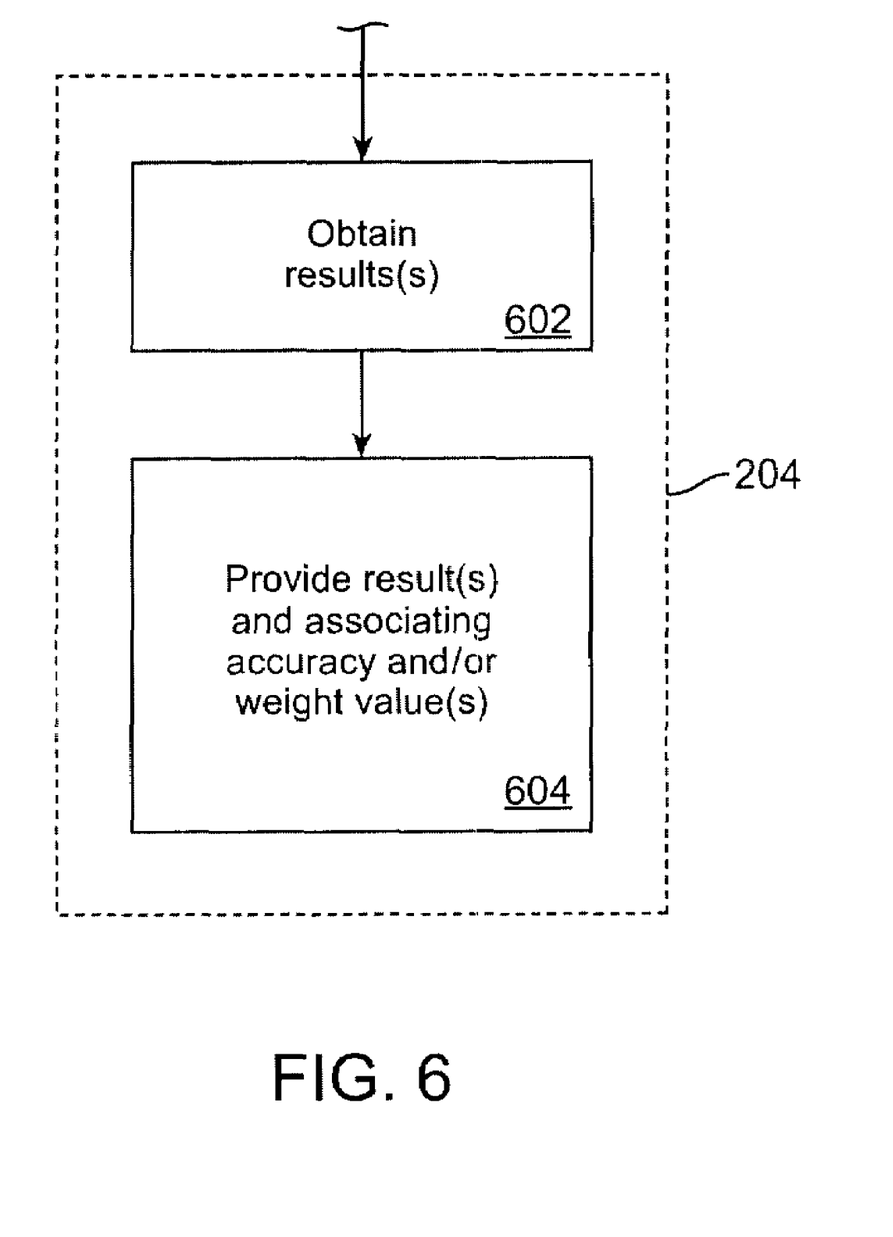
FIG. 6 illustrates a method for categorizing network traffic content using an accuracy of a technique result in accordance with other embodiments.

FIG. 6 illustrates a further technique for categorizing network traffic content in accordance with other embodiments, which does not involve performing an algorithm to categorize network traffic content. As shown in FIG. 6, the step 204 of categorizing content includes obtaining technique result(s) from step 202 (Step 602), and presenting result(s) of characterization by one or more techniques (e.g., ILA) in conjunction with a variable that is associated with an accuracy or quality of the result (Step 604) (FIG. 6). For example, in some embodiments, module 110 categorizes network traffic content by providing a message to user 104, wherein the message includes information, such as those shown in FIG. 3. In such cases, module 110 does not summarily place the content in a category, but allows user 104 to draw his/her conclusion based on the information presented.

It should be noted that although several methods for categorization network traffic content have been described with reference to accuracies for various techniques, the scope of the invention should not be so limited. In alternative embodiments, instead of or in addition to accuracy, other variables can also be used to categorize network traffic content. For example, in other embodiments, a weight value or factor can be associated with a result of a technique. The weight value can represent a characteristic of an analysis method, such as, usage frequency (e.g., higher weight value can be assigned to an analysis method that has a higher usage frequency, and vice versa), complexity of analysis technique (e.g., higher weight value can be assigned to analysis technique that is more advanced or complex), or update frequency (e.g., higher weight value can be assigned to analysis technique for which parameters for characterizing content are updated relatively more frequent). Also, in other embodiments, more than one weight factors for each technique are used. In accordance with another aspect of the invention, a memory is provided for storing accuracy value(s) and/or weight value(s) for each of the technique(s). The memory can be a disk, a computer hard drive, a server, or any device capable of storing electronic information. Such memory can be a component of module 110, a component that is configured to integrate with module 110, or a component that is coupled to module 110 via a communication link (wire or wireless).

As illustrated by the above examples, each of the techniques contributes to a final decision of content categorization. By using more than one technique (e.g., ILA, ELA, MTA, TKA) to characterize network traffic content, user 104 can obtain a more accurate content categorization (because one analysis technique may be more accurate than another). Also, including accuracy and/or weight value(s) associated with a technique result in a content categorization process is advantageous because they account for a quality and/or nature of the content categorization, thereby rendering the categorization result more accurate. In some cases, if the final decision is non-conclusive (e.g., result does not meet prescribed criteria for categorizing content), the content will be flagged and be sent to an operator for manual verification.

Although embodiments of module 110 and process 200 have been described with reference to categorizing Web content, it should be understood that the same or similar methods and modules may also be used to categorize other content, such as FTP, public server addresses, emails, telnet data, instant messenger data, SSH data, SFTP data, and any electronic information. In some embodiments, module 110 includes a protocol differentiator (not shown), which examines headers of the network traffic and determines the types of content being screened. Module 110 then analyzes content using prescribed analysis method(s) (e.g., ILA) for the type of content. For example, if it is determined that the network traffic content is Web content, then all four techniques (ILA, ELA, MTA, TKA) can be used to analyze the content. On the other hand, if it is determined that the network traffic content is an email, then only TKA, for example, is used to analyze the content. In some embodiments, each type of network traffic content is pre-assigned to a port of a network gateway by a default configuration. For example, HTTP, SMTP, POP, IMAP, and FTP data may each be pre-assigned to be transmitted through a designated port. In such case, protocol differentiator can determine a type of content based on an identification of a port transmitting the network content. In other embodiments, protocol differentiator can be configured to scan all available ports in order to determine a type of the network traffic content being screened.

Also, in other embodiments, instead of, or in addition to, determining a categorization of network traffic content, module 110 can be configured to control flow of network traffic content based on a determined characteristic of the network traffic content. For example, module 110 can be configured to block HTTP request, thereby preventing undesirable content, such as a Web page containing undesirable content, from being transmitted to user 104. In other cases, module 110 may erase network traffic content, or modify network traffic content based on a determined characteristic of the network traffic content, such that only portion(s) of the content is allowed to pass to user 104.

In some embodiments, a user interface can be provided that allows user 104 to select criteria or parameters for categorizing network traffic content. For example, module 110 can allow user 104 to set threshold(s) (e.g., minimum accuracy required before it should be considered), select weight values to be considered in a content categorization process, and designate number of categories for each content (sometimes a content can be categorized as belonging to more than one categories). Also, in other embodiments, the module 110 can allow user 104 to select which technique(s) (e.g., ILA, ELA, etc.) to use for a certain type of network content, and how result(s) of technique(s) is to be processed.

Computer Architecture

Figure 7:
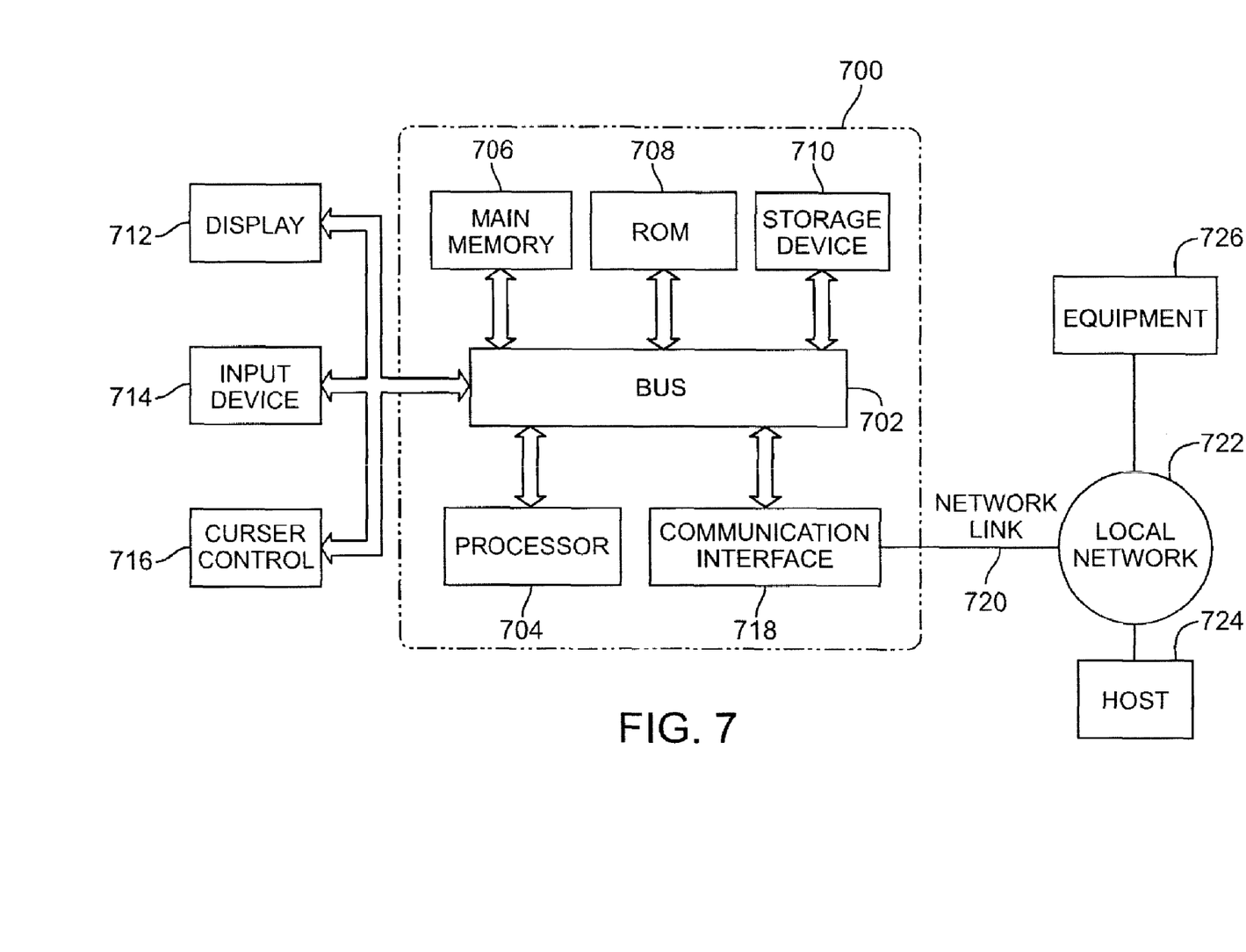
FIG. 7 is a diagram of a computer hardware system with which embodiments of the present invention can be implemented.

As described previously, module 110 can be implemented using software, hardware, or combination therefore. However, those skilled in the art understand that a computer system may also be used to implement module 110 to perform the functions described herein. FIG. 7 is a block diagram that illustrates an embodiment of a computer system 700 upon which embodiments of the method 200 may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 may further include a read only memory (ROM) 708 or other static storage device coupled to bus 702 for storing static information and instructions for processor 704. A data storage device 710, such as a magnetic disk or optical disk, is provided and coupled to bus 702 for storing information and instructions.

Computer system 700 may be coupled via bus 702 to a display 712, such as a cathode ray tube (CRT), for displaying information to user 104. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 can be used for processing network traffic content. According to some embodiments, such use may be provided by computer system 700 in response to processor 704 executing one or more sequences of one or more instructions contained in the main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement embodiments described herein. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to, non-volatile media, and volatile media. Non-volatile media includes, for example, optical or magnetic disks, such as storage device 710. Volatile media includes dynamic memory, such as main memory 706.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry data streams representing various types of information.

Network link 720 typically provides data communication through one or more networks to other devices. For example, network link 720 may provide a connection through local network 722 to a host computer 724. Network link 720 may also transmits data between an equipment 726 and communication interface 718. The data streams transported over the network link 720 can comprise electrical, electromagnetic or optical signals. The signals through the various networks and the signals on network link 720 and through communication interface 718, which carry data to and from computer system 700, are exemplary forms of carrier waves transporting the information. Computer system 700 can send messages and receive data, including program code, through the network (s), network link 720, and communication interface 718. Although one network link 720 is shown, in alternative embodiments, communication interface 718 can provide coupling to a plurality of network links, each of which connected to one or more local networks. In some embodiments, computer system 700 may receive data from one network, and transmit the data to another network. Computer system 700 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 110 may be implemented using one or more processors or one or more software. Also, in alternative embodiments, module 110 needs not perform all of the steps in FIG. 2. For example, in other embodiments, module 110 does not analyze content data (i.e., does not perform Step 202), but receives results of analysis from a source. In such cases, based on results of analysis received, module 110 then categorize network traffic content based on accuracies of the results. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for categorizing network traffic content, comprising:
   determining a first characterization of an entirety of the network traffic content contains more than one item;
   determining a first probability of accuracy associated with the first characterization;
   determining a second characterization of the entirety of the network traffic content and a second probability of accuracy associated with the second characterization, in which the second characterization is different from the first characterization;
   categorizing the network traffic content based at least in part on the first probability associated with the first characterization and the second probability associated with the second characterization; and
   wherein the first and second characterizations are individually determined at least in part according to at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising;
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

2. The method of claim 1, wherein the first characterization is determined using a first technique.

3. The method of claim 2, wherein the second characterization is determined using second technique that is different from the first technique.

4. The method of claim 1, wherein the act of categorizing further comprises selecting one of the first and the second characterizations which is associated with a higher one of the first or second probabilities of accuracy.

5. The method of claim 1, wherein the first and the second characterizations indicate that the network traffic content belong to a same category, and the categorizing further comprises using the first and the second probabilities of accuracy to obtain a combined probability.

6. The method of claim 5, wherein the categorizing further comprises determining whether the combined probability is at least a prescribed threshold.

7. The method of claim 5, further comprising:
   determining a third characterization of an entirety of the network traffic content using a third technique, which is different from the first and the second techniques; and
   determining a third probability of accuracy associated with the third characterization;
   wherein the categorizing further comprises comparing the combined probability with the third probability of accuracy.

8. The method of claim 1, wherein the act of categorizing comprises using the first characterization and the first probability of accuracy.

9. The method of claim 1, wherein the act of determining the first characterization comprises selecting the first characterization from a plurality of reference characterizations.

10. The method of claim 9, wherein each of the plurality of reference characterizations is associated with the first probability of accuracy.

11. The method of claim 9, wherein the plurality of reference characterizations are associated with different respective probabilities of accuracy.

12. The method of claim 1, wherein the network traffic content comprises URL, FTP, a server address, email content, an email address, telnet data, instant messenger data, SSH data, or SFTP data.

13. The method of claim 1, wherein the categorizing is performed in substantially real time.

14. The method of claim 1, wherein the first probability of accuracy is represented by a weight value.

15. The method of claim 1, in which the act of determining the second probability further comprises:
determining a third probability of accuracy associated with the first characterization using a second technique; and
replacing the second probability with a result of adding the third probability to the second probability.

16. The method of claim 1, in which a result of categorizing the network traffic content comprises a category of education or a category of news.

17. The method of claim 1, in which the act of determining the first characterization of an entirety of the network traffic content is performed using a first hardware or a combination of a second hardware and software, in which the first and the second hardware comprise an application specific integrated circuit or a semi-custom application specific integrated circuit.

18. The method of claim 1, further comprising:
determining a first statistic base upon the first probability of accuracy and the second probability of accuracy; and
associating the first statistic with the first technique regardless of the first characterization determined by the first technique.

19. The method of claim 1, wherein the network traffic content comprises a Web page or a Web downloadable content.

20. The method of claim 1, in which the first classification is a first type of Web content, and the second classification is a second type of Web content.

21. A computer program product includes a computer-readable medium, the computer-readable medium having a set of stored instructions, an execution of which causes a process for categorizing network traffic content to be performed, the process comprising:
determining a first characterization of an entirety of the network traffic content that contains more than one item;
determining a first probability of accuracy associated with the first characterization;
determining a second characterization of an entirety of the network traffic content and a second probability of accuracy associated with the second characterization, the second characterization being different from the first characterization; and
categorizing the network traffic content based at least in part on the first probability associated with the first characterization and the second probability associated with the second characterization;
wherein the first and second characterizations are individually determined at least in part according to at least one of an internal link analysis, an external link analysis, a meta tag analysis, and a token analysis, the internal link analysis comprising:
characterizing the network traffic content with a particular characterization when a majority of links associated with the network traffic content points to a URL associated with the particular characterization;
the external link analysis comprising:
characterizing the network traffic content as a function of a database of network traffic content URL characterizations;
the meta tag analysis comprising:
characterizing the network traffic content as a function of meta tags of the network traffic content associated with certain characterizations; and
the token analysis comprising:
characterizing text of the network traffic as a function of a number of words in the text also included in a database of characterized words.

22. The computer program product of claim 21, wherein the network traffic content comprises a Web page or a Web downloadable content.

23. The computer program product of claim 21, in which the first classification is a first type of Web content, and the second classification is a second type of Web content.

24. The method of claim 21, in which the first classification is a first type of content, and the second classification is a second type of content that is not an opposite of the first type.

25. The computer program product of claim 21, in which the first classification is a first type of content, and the second classification is a second type of content that is not an opposite of the first type.

26. A device for categorizing network traffic content, comprising:
means for determining a first characterization of an entirety of the network traffic content that contains more than one item;
means for determining a first probability of accuracy associated with the first characterization, wherein the means for determining a first probability comprises a processor; and
means for determining a second characterization of an entirety of the network traffic content and a second probability of accuracy associated with the second characterization, in which the second characterization is different from the first characterization; and
means for categorizing the network traffic content based at least in part on the first probability associated with the first characterization and the second probability associated with the second characterization, wherein
the means for determining a first probability of accuracy comprises a processor;
wherein the first and second characterizations are individually determined at least in part according to at least one of an internal link analysis, an external link analysis, a meta tag analysis, and a token analysis, the internal link analysis comprising:
characterizing the network traffic content with a particular characterization when a majority of links associated with the network traffic content points to a URL associated with the particular characterization;
the external link analysis comprising:
characterizing the network traffic content as a function of a database of network traffic content URL characterizations;
the meta tag analysis comprising:
characterizing the network traffic content as a function of meta tags of the network traffic content associated with certain characterizations; and
the token analysis comprising:
characterizing text of the network traffic as a function of a number of words in the text also included in a database of characterized words.

27. The device of claim 26, wherein the network traffic content comprises a Web page or a Web downloadable content.

28. The device of claim 26, in which the first classification is a first type of Web content, and the second classification is a second type of Web content.

29. The device of claim 26, in which the first classification is a first type of content, and the second classification is a second type of content that is not an opposite of the first type.

30. A method for use in a process to categorize network traffic content, comprising:
   obtaining a plurality of data, each of the plurality of data representing a probability of accuracy of a characterization of an entirety of network traffic content that contains more than one item, wherein the network traffic content comprises a Web page or a Web downloadable content; and
   associating each of the plurality of data with a technique for characterizing network traffic content;
   wherein the plurality of data comprises four values representing probabilities of accuracy for respective four techniques of characterizing network traffic content, the four techniques including at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

31. The method of claim 30, further comprising categorizing network traffic content based at least in part on the plurality of data.

32. A computer program product includes a computer-readable medium, the computer-readable medium having a set of stored instructions, an execution of which causes a process to be performed, the process comprising:
   obtaining a plurality of data, each of the plurality of data representing a probability of accuracy of a characterization of an entirety of network traffic content, wherein the network traffic content comprises a Web page or a Web downloadable content; and
   associating each of the plurality of data with a technique for characterizing network traffic content;
   wherein the plurality of data comprises four values representing probabilities of accuracy for respective four techniques of characterizing network traffic content, the four techniques including at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

33. A device for categorizing network traffic content, comprising:
   means for obtaining a plurality of data, each of the plurality of data representing a probability of accuracy of a characterization of an entirety of network traffic content, wherein the network traffic content comprises a Web pane or a Web downloadable content and the network traffic content contains more than one item; and
   means for associating each of the plurality of data with a technique for characterizing network traffic content, wherein the means for associating each of the plurality of data comprises a processor;
   wherein the plurality of data comprises four values representing probabilities of accuracy for respective four techniques of characterizing network traffic content, the four techniques including at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

34. A method for categorizing network traffic content, comprising:
   determining a plurality of characterizations of an entirety of the network traffic content that contains more than one item;
   determining a weight value associated with each of the plurality of characterizations; and
   categorizing network traffic content based at least in part on the plurality of characterizations of the network traffic content and the weight value associated with each of the plurality of characterizations;
   wherein the plurality characterizations include a characterization determined according to at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:

characterizing text of the network traffic as a function of a number of words in the text also included in a database of characterized words.

35. The method of claim 34, wherein the weight value represents an accuracy of the characterization.

36. The method of claim 34, wherein the weight value is associated with a frequency of usage of a technique used to obtain the characterization.

37. The method of claim 34, wherein the weight value is associated with a complexity of a technique used to obtain the characterization.

38. The method of claim 34, wherein the weight value is associated with a frequency in which a parameter for characterizing content is updated.

39. The method of claim 34, wherein the network traffic content comprises a Web page or a Web downloadable content.

40. A computer program product includes a computer-readable medium, the computer-readable medium having a set of stored instructions, an execution of which causes a process to be performed, the process comprising:
   determining a plurality of characterizations of an entirety of the network traffic content that contains more than one item;
   determining a weight value associated with each of the plurality of characterizations; and
   categorizing network traffic content based at least in part on the plurality of characterizations of the network traffic content and the weight value associated with each of the plurality of characterizations;
   wherein the plurality characterizations include a characterization determined according to at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

41. The computer program product of claim 40, wherein the network traffic content comprises a Web page or a Web downloadable content.

42. A device for categorizing network traffic content, comprising:
   means for determining a plurality of characterizations of an entirety of the network traffic content that contains more than one item, wherein the means for determining a plurality of characterizations comprises a processor;
   means for determining a weight value associated with each of the plurality of characterizations; and
   means for categorizing network traffic content based at least in part on the plurality of characterizations of the network traffic content and the weight value associated with each of the plurality of characterizations;
   wherein the plurality characterizations include a characterization determined according to at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

43. The device of claim 42, wherein the network traffic content comprises a Web page or a Web downloadable content.

44. A method for categorizing network traffic content, comprising:
   determining a first characterization of an entirety of the network traffic content that contains more than one item;
   determining a first probability of accuracy associated with the first characterization;
   determining a second characterization of an entirety of the network traffic content;
   determining a second probability of accuracy associated with the second characterization; and
   categorizing the network traffic content based at least in part on the first characterization, the second characterization, the first probability of accuracy, and the second probability of accuracy; and
   wherein the first and second characterizations are individually determined at least in part according to at least one of an internal link analysis, an external link analysis, a meta tag analysis, and a token analysis, the internal link analysis comprising:
      characterizing the network traffic content with a particular characterization when a majority of links associated with the network traffic content points to a URL associated with the particular characterization;
   the external link analysis comprising:
      characterizing the network traffic content as a function of a database of network traffic content URL characterizations;
   the meta tag analysis comprising:
      characterizing the network traffic content as a function of meta tags of the network traffic content associated with certain characterizations; and
   the token analysis comprising:
      characterizing text of the network traffic as a function of a number of words in the text also included in a database of characterized words.

45. The method of claim 44, wherein the network traffic content comprises a Web page or a Web downloadable content.

46. A system for categorizing network traffic content, comprising:
   means for determining a first characterization of an entirety of the network traffic content that contains more than one item;

means for determining a first probability of accuracy associated with the first characterization, wherein the means for determining a first probability comprises a processor;

means for determining a second characterization of an entirety of the network traffic content using a second technique, wherein the second technique is different from the first technique;

means for determining a second probability of accuracy associated with the second characterization; and means for categorizing the network traffic content based at least in part on the first characterization, the second characterization, the first probability of accuracy, and the second probability of accuracy; and wherein the first and second characterizations are individually determined at least in part according to at least one of an internal link analysis, an external link analysis, a meta tag analysis, and a token analysis, the internal link analysis comprising:

characterizing the network traffic content with a particular characterization when a majority of links associated with the network traffic content points to a URL associated with the particular characterization;

the external link analysis comprising:

characterizing the network traffic content as a function of a database of network traffic content URL characterizations;

the meta tag analysis comprising:

characterizing the network traffic content as a function of meta tags of the network traffic content associated with certain characterizations; and the token analysis comprising:

characterizing text of the network traffic as a function of a number of words in the text also included in a database of characterized words.

47. The system of claim 46, in which the means for determining the first characterization of the entirety of the network traffic content comprises a first hardware or a combination of a second hardware and software, wherein the first hardware and the second hardware comprise an application specific integrated circuit or a semi-custom application specific integrated circuit.

48. The system of claim 46, wherein the network traffic content comprises a Web page or a Web downloadable content.

49. A computer program product includes a computer-readable medium, the computer-readable medium having a set of stored instructions, an execution of which causes a process to be performed, the process comprising:

determining a first characterization of an entirety of the network traffic content contains more than one item;

determining a first probability of accuracy associated with the first characterization;

determining a second characterization of an entirety of the network traffic content using a second technique, wherein the second technique is different from the first technique;

determining a second probability of accuracy associated with the second characterization; and categorizing the network traffic content based at least in part on the first characterization, the second characterization, the first probability of accuracy, and the second probability of accuracy; and wherein the first and second characterizations are individually determined at least in part according to at least one of an internal link analysis, an external link analysis, a meta tag analysis, and a token analysis, the internal link analysis comprising:

characterizing the network traffic content with a particular characterization when a majority of links associated with the network traffic content points to a URL associated with the particular characterization;

the external link analysis comprising:

characterizing the network traffic content as a function of a database of network traffic content URL characterizations;

the meta tag analysis comprising:

characterizing the network traffic content as a function of meta tags of the network traffic content associated with certain characterizations; and the token analysis comprising:

characterizing text of the network traffic as a function of a number of words in the text also included in a database of characterized words.

50. The computer program product of claim 49, wherein the network traffic content comprises a Web page or a Web downloadable content.

* * * * *

UNITED STATES PATENT AND TRADEMARK OFFICE
CERTIFICATE OF CORRECTION

PATENT NO. : 7,565,445 B2
APPLICATION NO. : 10/993629
DATED : July 21, 2009
INVENTOR(S) : Michael Xie It is certified that error appears in the above-identified patent and that said Letters Patent is hereby corrected as shown below:

Column 12, Line 64, "categorizing the network traffic content based" should read -- categorizing the network traffic content, in a computer processor, based --.
Column 13, Lines 31-32, "a computer-readable medium, the computer-readable medium having" should read -- a computer-readable storage medium, the computer-readable storage medium having --.
Column 14, Line 36, "comprises a processor," should read -- comprises a processor to execute instructions stored in a memory; --.
Column 15
Line 9, "associating each of the" should read -- processing in a computer processor to associate each of the --.
Lines 2-3, "a computer-readable medium, the computer-readable medium having" should read -- a computer-readable storage medium, the computer-readable storage medium having --.
Column 16
Lines 9-10, "Web pane" should read -- Web page --.
Line 15, "comprises a processor;" should read -- comprises a processor to execute instructions stored in a memory; --.
Line 46, "categorizing network traffic content based" should read -- categorizing network traffic content, in a computer processor, based --.
Column 17
Lines 18-19, "a computer-readable medium, the computer-readable medium having" should read -- a computer-readable storage medium, the computer-readable storage medium having --.
Line 61, "comprises a processor;" should read -- comprises a processor to execute instructions stored in a memory; --.
Column 18, Line 35, "categorizing the network traffic content based" should read -- categorizing the network traffic content, in a computer processor, based --.
Column 19, Lines 3-4, "comprises a processor;" should read -- comprises a processor to execute instructions stored in a memory; --.

UNITED STATES PATENT AND TRADEMARK OFFICE
CERTIFICATE OF CORRECTION

PATENT NO. : 7,565,445 B2
APPLICATION NO. : 10/993629
DATED : July 21, 2009
INVENTOR(S) : Michael Xie It is certified that error appears in the above-identified patent and that said Letters Patent is hereby corrected as shown below:

Column 20, Lines 1-2, "a computer-readable medium, the computer-readable medium having" should read -- a computer-readable storage medium, the computer-readable storage medium having --.

Signed and Sealed this

Third Day of November, 2009

David J. Kappos
*Director of the United States Patent and Trademark Office*